May 30, 1967 SHINE YASUOKA ET AL 3,322,892

TELEVISION SIGNAL RECORDING AND REPRODUCING WITH SYNC SIGNAL REGENERATION

Filed Dec. 24, 1963 10 Sheets-Sheet 1

Inventors
Shine Yasuoka
Tomio Oyama
Shozo Aratani
Hiromu Tanaka
By Stevens, Davis, Miller + Mosher
ATTORNEYS Inventors
Shine Yasuoka
Tomio Oyama
Shozo Aratani
Hiromu Tanaka
By Stevens, Davis, Miller & Mosher
ATTORNEYS

A

A'

Inventors
Shine Yasuoka
Tomio Oyama
Shozo Aratani
Hiromu Tanaka
By Stevens, Davis, Miller & Mosher
ATTORNEYS Inventor
Shine Yasuoka
Tomio Oyama
Shozo Aratani
Hiromu Tanaka
By Stevens, Davis, Miller & Mosher
ATTORNEYS Inventors
Shine Yasuoka
Tomio Oyama
Shozo Aratani
Hiromu Tanaka
By Stevens, Davis, Miller & Mosher
ATTORNEYS Inventors
Shine Yasuoka
Tomio Oyama
Shozo Aratani
Hiromu Tanaka
By Stevens, Davis, Miller & Mosher
ATTORNEYS Inventors
Shine Yasuoka
Tomio Oyama
Shozo Aratani
Hiromu Tanaka
By Stevens, Davis, Miller & Mosher
ATTORNEYS Inventor
Shine Yasuoka
Tomio Oyama
Shozo Aratani
Hiromu Tanaka
By Stevens, Davis, Miller & Mosher
ATTORNEYS Inventors
Shine Yasuoka
Tomio Oyama
Shozo Aratani
Hiromu Tanaka
By Stevens, Davis, Miller + Mosher
ATTORNEYS PRIOR ART FIG. 17
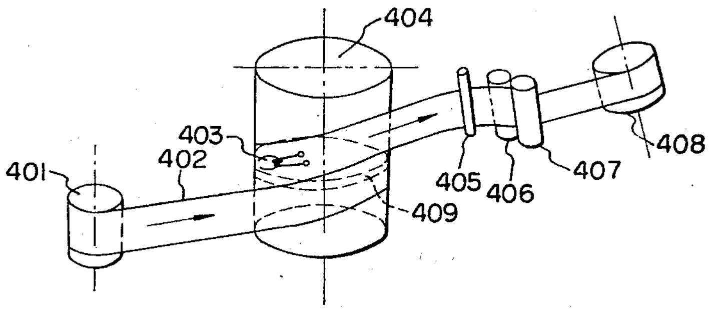
PRIOR ART FIG. 18
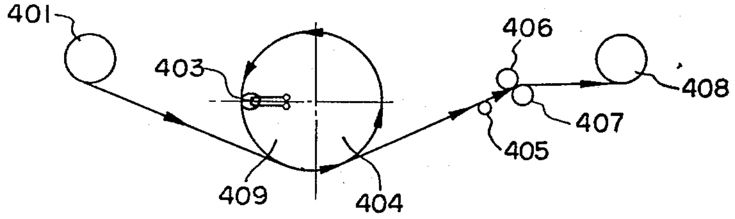
PRIOR ART FIG. 19
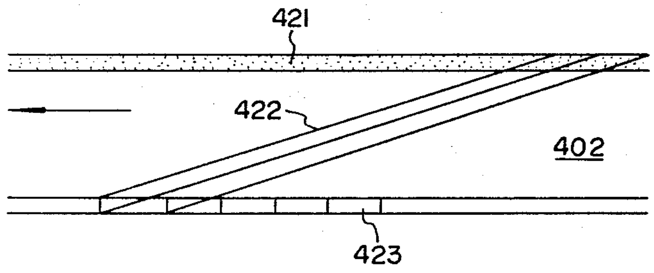
Inventors
Shine Yasuoka
Tomio Oyama
Shozo Aratani
Hiromu Tanaka
By Stevens, Davis, Miller & Mosher
ATTORNEYS United States Patent Office 3,322,892

Patented May 30, 1967

3,322,892

TELEVISION SIGNAL RECORDING AND REPRODUCING WITH SYNC SIGNAL REGENERATION

Shino Yasuoka and Tomio Oyama, Toyonaka-shi, Shozo Aratani, Osaka, and Hiromu Tanaka, Moriguchi-shi, Japan, assignors to Matsushita Electric Industrial Co., Ltd., Osaka, Japan, a corporation of Japan Filed Dec. 24, 1963, Ser. No. 333,144

Claims priority, application Japan, Dec. 27, 1962, 37/59,302; Dec. 28, 1962, 37/59,708, 37/59,713; Oct. 26, 1963, 38/57,837

7 Claims. (Cl. 178—6.6)

The present invention relates to means for recording and reproducing in a magnetic recording and reproducing system, and more particularly to a magnetic recording and reproducing device having means for recording a television signal by a rotary head including a magnetic transducer and means for electrically dealing with a period of discontinuity which appears during the reproducing.

In conventional magnetic recording methods of directly recording on a magnetic tape a signal such as a television signal having an extremely high frequency or an excessively wide frequency band, it is generally necessary to provide an extremely great relative speed between a gap of a recording or a reproducing head and a moving magnetic medium in order to effect the recording or reproducing of a high frequency component of the signal. On the other hand, the magnetic medium such as a magnetic tape is required to travel at an ordinary low speed. For compromise to satisfy both of these requirements, the required relative speed between the tape and the recording head is attained by mechanically rotating the magnetic head in the transverse direction of the tape. The magnetic tape is made to transport the head in the longitudinal direction of the tape at a rate of 15 inches per second, and the signal is recorded in the form of a series of transverse lines or tracks. According to such conventional method, the rotary disc is rotated at 14,400 r.p.m. and has disposed on its periphery a tape guide member which covers the peripheral face of said disc through an angle of about 100° to permit abutment with the tape of a width of 2 inches.

As an improvement in the above method, there is a method in which a head is arranged to sweep diagonally on a magnetic tape. According to this improved method, the tape is arranged to make a turn about a stationary cylinder and a rotary head is disposed in the cylindrical tape guide member, so that the tape runs diagonally with respect to the cylindrical tape guide member and diagonal tracks of record are formed on the tape. In this case, discontinuity of the magnetized tracks on the tape by the recording signal may appear on both ends of the tape due to the sweep by the single magnetic head. Such discontinuity of the tracks appears as lack of the reproduced signal in reproduction.

When, therefore, the device such as described above is utilized to record and reproduce a television signal, general procedure is such that said non-recorded portions are made to correspond with a vertical blanking period of the television signal to be recorded. This method, however, is defective in that, since said non-recorded portions are not fixed but are varying from time to time, the vertical synchronizing signal may not be recorded frequently and, as a result thereof, a television signal lacking the vertical synchronizing signal is obtained during the reproducing, which causes instability in the reproduced pictures. In order to remove such defect, there is also proposed a method in which a new synchronizing signal is introduced during reproducing by a vertical synchronizing signal generator of separate installation. This method, however, is also defective in that an excessively complicated and expensive device is required and therefore is not suitable to a television signal recording and reproducing device of simple type.

With the above defects of prior technique in view, the primary object of the invention is to provide improved means for recording and reproducing in a device for recording and reproducing a television signal comprising a magnetic tape and a rotary head including a magnetic transducer.

Another object of the invention is to provide a magnetic recording and reproducing device of said character wherein the magnetic transducer is adapted to successively sweep diagonally across a magnetic tape and means are provided to maintain said magnetic transducer in disengagement from said magnetic tape for a constant range during a period from the end of one sweep by said magnetic transducer on said magnetic tape to the beginning of the succeeding sweep so as to provide a non-recorded period during said range, while said rotary head is made to rotate in synchronism with a cycle of a vertical synchronizing signal in a television signal so that said non-recorded period is disposed in a vertical blanking period of said television signal.

Still another object of the invention is to provide a magnetic recording and reproducing device of said character wherein means are provided to record a video signal including a horizontal synchronizing signal in a television signal by the rotary head on a magnetic tape, to record a vertical synchronizing signal on one edge of said magnetic tape, to reproduce said recorded vertical synchronizing signal from said magnetic tape to thereby obtain a synchronizing signal responsive to said reproduced vertical synchronizing signal, to reproduce said recorded video signal from said magnetic tape, and to combine said reproduced video signal with said synchronizing signal.

Yet another object of the invention is to provide a magnetic recording and reproducing device of said character wherein means are provided to draw out an electrical signal dependent upon the rotation of the rotary head to record said signal on one edge of a magnetic tape, and to reproduce, during reproducing, said recorded electrical signal from the magnetic tape to thereby obtain a synchronizing signal responsive to said electrical signal.

Further, another object of the invention is to provide a magnetic recording and reproducing device of said character wherein means are provided to obtain an electrical signal dependent upon the rotation of the rotary head, to obtain a vertical synchronizing signal responsive to said electrical signal, and to combine a reproduced video signal with said synchronizing signal.

Another object of the invention is to provide a magnetic recording and reproducing device wherein means are provided to dispose a non-recorded period in a vertical blanking period of a television signal excluding a vertical synchronizing signal when said television signal is recorded.

Still another object of the invention is to provide a magnetic recording and reproducing device of said character wherein means are provided to reproduce a recorded video signal from a magnetic tape, and to eliminate any noise existing in a non-recorded period included in said reproduced video signal.

Yet another object of the invention is to provide a magnetic recording and reproducing device of said character comprising a tape guide member having the rotary head disposed therein, a first idler roller having an axis disposed in parallel with the axis of said tape guide member and adapted to guide a magnetic tape towards a portion at which the magnetic transducer starts to sweep the magnetic tape, and a second idler roller having an axis disposed in parallel with the axis of said tape guide memer and adapted to urge said magnetic tape away from iid tape guide member at a portion at which the sweep y the magnetic transducer on the magnetic tape is termiated, said two idler rollers and said tape guide member eing fixed on a base plate so that the magnetic transucer can be held in disengagement from the magnetic ipe for a constant range.

Further, another object of the invention is to provide magnetic recording and reproducing device of said charcter comprising means for recording a video signal inuding a horizontal synchronizing signal of a television gnal on a magnetic tape by the rotary head, means for cording a vertical synchronizing signal on one edge of iid magnetic tape, means for deriving said vertical synronizing signal from said magnetic tape during reproucing, a pulse generator for generating a synchronizing gnal responsive to said vertical synchronizing signal, ieans for reproducing said recorded video signal from ie magnetic tape, a noise killer for eliminating any noise xisting in a non-recorded period included in said reprouced video signal, and a mixer for combining the output f said noise killer with said synchronizing signal.

A further object of the invention is to provide a magetic recording and reproducing device of said character omprising means for recording a video signal including a orizontal synchronizing signal of a television signal by ie rotary head on a magnetic tape, means for deriving n electrical signal dependent upon the rotation of the otary head, means for recording said electrical signal n one edge of the magnetic tape, means for taking out iid electrical signal from the magnetic tape during reroducing, a pulse generator for generating a synchroizing signal responsive to said reproduced electrical ignal, a noise killer for eliminating any noise existing in non-recorded period included in said reproduced video ignal, and a mixer for combining the output of said noise iller with said synchronizing signal.

A still further object of the invention is to provide a iagnetic recording and reproducing device of said charcter comprising means for recording a video signal inluding a horizontal synchronizing signal of a television ignal on a magnetic tape by the rotary head, a pulse enerator for generating a pulse signal dependent upon he rotation of the rotary head, a synchronizing pulse enerator operative in response to said pulse signal for enerating a synchronizing signal, means for reproducng said recorded video signal from the magnetic tape, a oise killer for eliminating any noise existing in a nonecorded period included in said reproduced video signal, nd a mixer for combining the output of said noise killer vith said synchronizing signal.

A yet further object of the invention is to provide a nagnetic recording and reproducing device of said charcter comprising means for disposing a non-recorded peiod in a vertical blanking period of a television signal xcluding a vertical synchronizing signal when said teleision signal is recorded on a magnetic tape, means for eproducing said recorded television signal from the magietic tape, and a noise killer for eliminating any noise xisting in said non-recorded period included in said reroduced television signal.

There are other objects and particularities of the invention which will become obvious from the following decription with reference to the accompanying drawings, in vhich:

FIG. 17 is an explanatory perspective view of a conventional magnetic recording and reproducing device comprising a rotary head including a magnetic transducer and having no means for maintaining a constant nonrecorded period;

FIG. 18 is a top plan view of the conventional device shown in FIG. 17; and

FIG. 19 is a plan view of a magnetic tape on which tracks are shown as recorded by the device of FIG. 17.

Figure 1:
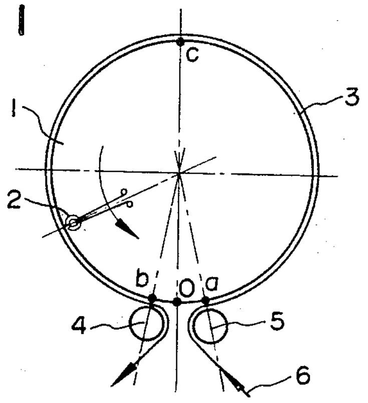
FIG. 1 is a plan view of a rotary head mechanism in magnetic recording and reproducing device of the invention adapted for recording and reproducing a televiion signal comprising a rotary head including a magnetic ransducer.

FIGS. 1–16 show a magnetic recording and reproducing device according to the invention wherein a television signal is recorded by a rotary head including a magnetic transducer with a period of discontinuity maintained constant, and a non-recorded period generated during reproducing is electrically dealt with to compensate a necessary synchronizing signal to thereby effect reproduction of stable television pictures.

Although, in contrast thereto, some explanation has been made with regard to a conventional device, further detailed explanation thereof will assist in better understanding of the contents of the device of the invention which will be explained in detail in the later description. There are several examples of the conventional devices at hand, but description will now be directed to a typical one of such devices. According to such device, a magnetic tape turns spirally about a peripheral surface of a cylindrical member in abutting relation thereto and a rotary head is made to continuously sweep diagonally across the tape. This device is described more or less in detail on pages 27–29 of a German magazine titled, "Electronische Rundschau," January number, 1963, and on pages 823–825 of a Japanese magazine "Toshiba Review," March number, 1961. Therefore, an outline of the recording and reproducing method disclosed therein will be given hereinunder although it may be too brief to be understood.

The conventional device cited above has a structure as shown in FIGS. 17–19. The device comprises a cylinder 404 split into upper and lower members coaxially disposed, a disk 409 adapted for rotation in a narrow gap between said upper and lower cylinders, a head 403 including a transducer mounted on said rotary disk, and an electric head driving motor (not shown) accommodated in said lower cylinder.

A tape 402 is supplied from a supply reel 401, helically turns about a peripheral surface of the cylinder 404 in abutting relation thereto, fed past a capstan 406 and a pinch roller 407 and finally is taken up on a take-up reel 408. A multiplicity of pin-shaped guides are embedded in the surface of the cylinder 404 for determining the vertical position of the tape on the cylinder 404. The rotary head is rotated by the motor in abutting relation with the tape at a rate of 3600 r.p.m. Therefore, a picture of one field is recorded in one track 422 slanted to the tape.

The tape 402 is transported from the left-hand side of the FIG. 17 towards the right-hand side, and the video track 422 is diagonally written on the tape 402. In the travelling passage of the tape 402, there is provided a fixed head supporting column 405 on which heads for recording and reproducing sound and a control signal are mounted so that a sound track 421 and a control track 423 are recorded on the upper and lower edges of the tape 402, respectively. Due to the fact that these tracks 421 and 423 intersect the video track 422 at a small angle of the order of 4° as shown in FIG.19, and owing to a value of a recording frequency, there is little chance of cross modulation induced by the intersection of the tracks. However, for the sake of safety, the rotating phase of the rotary head is so controlled that portions of the video track 422 at which the tracks 421 and 423 intersect the track 422 are disposed in vertical blanking periods of the video signal.

However, in this method of transporting the tape on the cylinder in a spiral manner, it is difficult to maintain a non-recorded range constantly which appears during change-over of the tracks. No constancy can be maintained in the non-recorded periods occurring during the change-over of the tracks or in transient times following the non-recorded periods, and when these breaks coincide with the periods of the vertical synchronizing signal in the vertical blanking periods, no vertical synchronizing signal or at most an incomplete vertical synchronizing signal may appear in the reproduced signal, resulting in instability of the reproduced pictures.

The defects of such conventional device is fully removed by the magnetic recording and reproducing device of the invention, in which a magnetic tape is made to travel on a surface of a cylindrical member in an omega-shape instead of the previous spiral-shape, constancy of a non-recorded period is secured by two idler rollers, any noise produced in the non-recorded period is eliminated during reproducing, and a vertical synchronizing signal is electrically generated or shaped to thereby attain the stabilization of the reproduced pictures.

Figure 2:
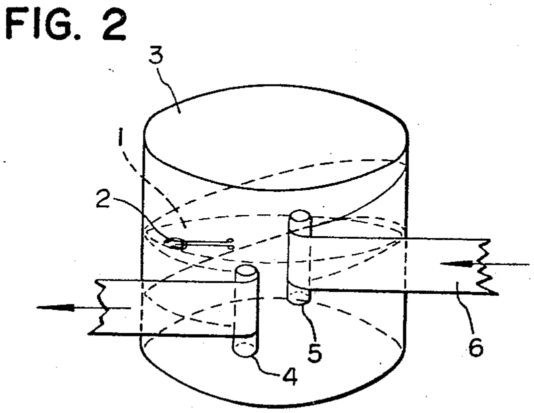
FIG. 2 is a perspective view of the rotary head mechaiism shown in FIG. 1.
Figure 3:
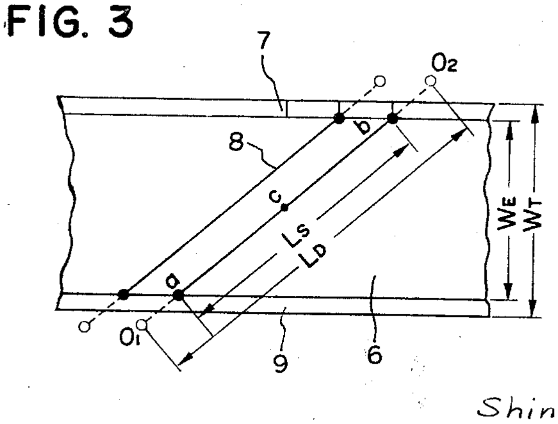
FIG. 3 is a plan view of a magnetic tape on which racks are shown as recorded by the device of FIG. 1.

A preferred embodiment of the device according to the invention is illustrated in FIGS. 1–3.

A magnetic head 2 mounted on a rotary disc 1 is adapted to successively sweep diagonally across a magnetic tape 6 which runs on the surface of a cylindrical tape guide member 3 at a predetermined speed in an omega-shape in the direction of arrow. The rotary disk 1 is driven by an electric motor (not shown) which is rotated by a driving circuit in synchronism with a vertical synchronizing signal of a television signal to be recorded. Therefore, one field of the television signal is recorded in one track on the magnetic tape 6. The magnetic tape 6 is made to travel past a first idler roller 5, guided onto the tape guide member 3 to travel on it in abutting relation thereto and guided away from the guiding member 3 through a second idler roller 4. The first idler roller 5 has an axis parallel with the axis of the tape guide member 3 and acts to guide the magnetic tape 6 to a portion *a* at which the rotary head 2 starts to sweep the magnetic tape 6. The second idler roller 4 also has an axis parallel with the axis of the tape guide member 3 and acts to guide the magnetic tape 6 away from the guide member at a portion *b* at which the sweep by the rotary head 2 on the magnetic tape 6 terminates. Therefore, a perior $L_s$ during which the magnetic tape 6 is in abutment with the tape guide member 3 along its peripheral face *acb* is shorter than a period $L_D$ during which the magnetic tape abuts the guide member 3 making a complete round about the peripheral face $O_1acbO_2$ as in the conventional case, and there is a non-abutting range *aob*.

Figure 6A:
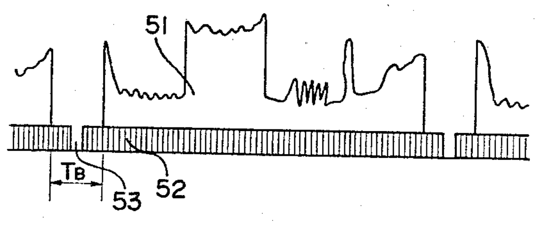
FIG. 6 is a view showing a wave form of the television signal to be recorded and reproduced by the device of the invention.
Figure 6B:
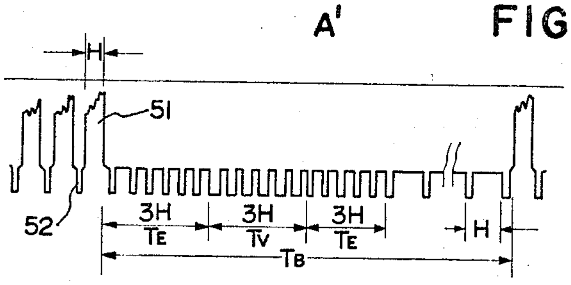

The two idler rollers 4 and 5 and the tape guide member 3 are fixed on a common base plate (not shown) so that the non-abutting range *aob* (FIG. 1) can be invariably maintained. When a television signal A as shown in FIG. 6A is recorded, a non-recorded period $T_N$ will be caused by the presence of said non-abutting range as shown in FIG. 7. The non-recorded period $T_N$ is made to be positioned within a vertical blanking period $T_B$ (FIG. 6A) of the television signal A. As shown in A′ of FIG. 6B showing an enlarged view of part of the television signal A, the vertical blanking period $T_B$ comprises one vertical synchronizing period $T_V$, two equalizing pulse periods $T_E$ and a multiplicity of horizontal synchronizing periods H, and each of the periods $T_V$ and $T_E$ has a length three times a length of one horizontal synchronizing period H, that is, a length of 3H. The length of the non-recorded period $T_N$ (FIG. 7) within the vertical blanking period $T_B$ is so regulated as to have a time interval approximately corresponding to a period of nine horizontal scanning lines (hereinafter referred to as 9H). Ordinarily, in a television receiver, it is known that, in spite of the absence of about nine pulses of the horizontal synchronizing signal 52 (FIG. 6B, A′), derangement in the horizontal synchronization does not disturb the stability of the television picture by virtue of automatic frequency control means incorporated in a horizontal oscillator in the receiver. As a result thereof, the reproduced picture in the television receiver is free from trouble in spite of the deficiency of the horizontal synchronizing signal 52 for a period of the order of 9H.

Now, in FIG. 3, assume that the magnetic tape 6 has a width $W_T$ of 1 inch or 25.4 mm., and a sound track 9 and a control track 7 occupy a width of 2.7 mm. at the respective edges. Then, the width $W_E$ of a video track 8 is 20.0 mm. which is available for recording the television signal. Assume that the tip portion of the magnetic head 2 mounted on the rotary disc 1 rotating at 3,600 r.p.m. in synchronous relation with the vertical synchronizing signal of the television signal rotates at a peripheral speed of 18 meters per second on the surface of the tape guide member 3. Then, the length $L_s$ of the video track (FIG. 3) recorded on the arc *acb* of the tape guide member 3 is 289.8 mm. When the transporting speed of the tape is 11.98 inches per second, a pitch between the recorded video tracks will be 0.350 mm.

Figure 4:
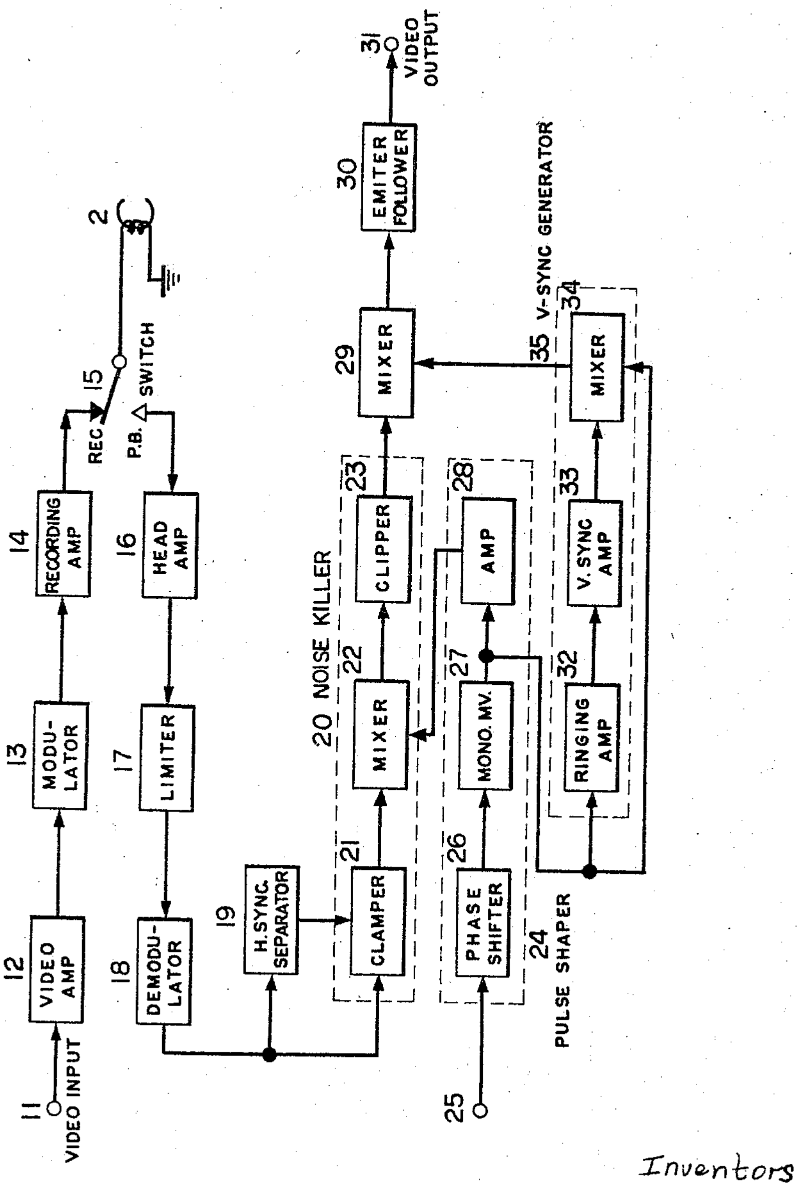
FIG. 4 is a block diagram of an electrical circuit when a non-recorded period is disposed in a vertical blanking period of a television signal in the magnetic recording and reproducing device of the invention.

Now, the operation of the magnetic recording and reproducing device of the invention will be explained with reference to FIGS. 4 and 7. The television signal A fed from an input terminal 11 is amplified to a required level by a video amplifier 12 and sent to a modulator 13. In this modulator 13, the television signal A is converted into a modulated signal suitable for magnetic recording. Frequency modulation at a low modulation index is commonly used as it is suitable for magnetic recording. The modulated signal is amplified by a recording amplifier 14 and conducted through a switch 15 to the magnetic head 2, by which each field of the television signal is recorded on the magnetic tape 6 in the form of a magnetized pattern.

Figures 7A, 7B, 7C, 7D, 7E, 7F, 7G, 7H, 7I, 7J, 7K, 7L:
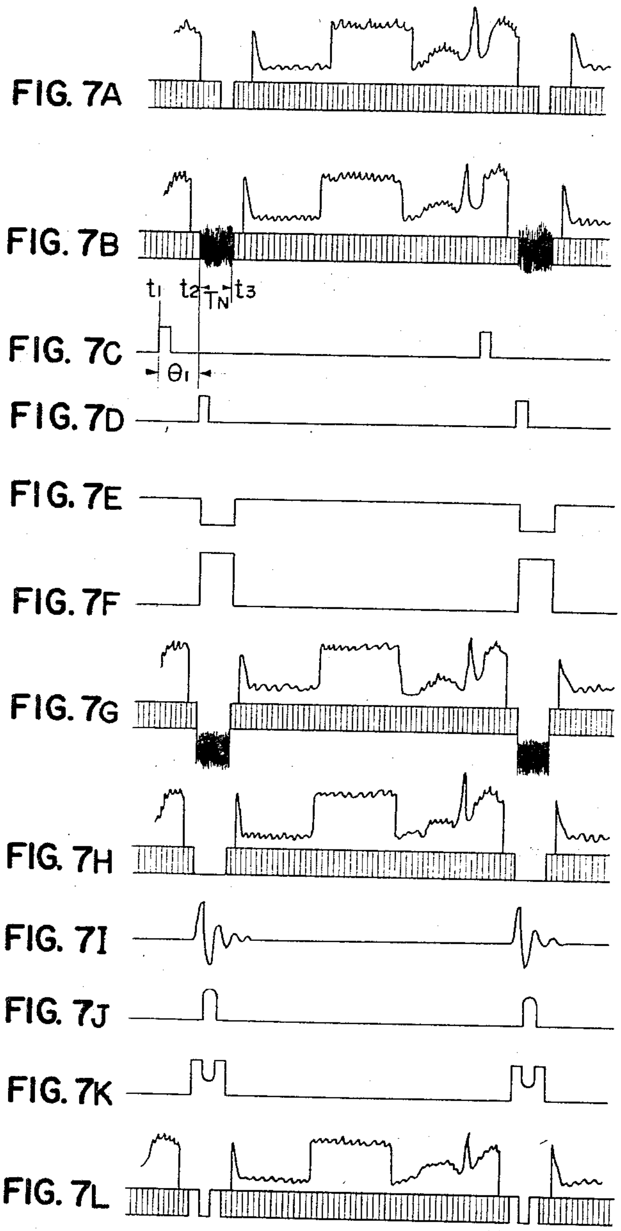
FIG. 7 is a view showing wave forms at various points of the circuit shown in FIG. 4.

During reproducing, the reproduced signal is taken out y the magnetic head 2 and conducted to a head amplifier 6 through the switch 15. Said reproduced signal is amplied to a required level in this circuit, and the amplitude f the reproduced signal is made uniform by a limiter 17, ubsequently the signal is fed to a demodulator 18. The gnal reproduced to the original video signal in the deodulator 18 includes the discontinuous period $T_N$ within s vertical blanking period $T_B$ as shown in FIG. 7B, and enerally includes noises, while the horizontal synchroizing signal 52 and the video signal 51 are perfectly reroduced. In case the vertical synchronizing signal is lost r degraded by the non-recorded period $T_N$ after the noise icluded in said non-recorded period $T_N$ has been suppressed or killed, the vertical synchronizing signal is electically reproduced and added to the video signal in a iixer 29 to obtain a reproduced video signal 7L.

With regard to the relation between the vertical synhronizing signal 53 and the non-recorded period $T_N$, iere may be considered two cases, that is, the case wherei the vertical synchronizing signal 53 is included in the on-recorded period $T_N$ and the case wherein the vertical ynchronizing signal 53 is not included in the non-reorded period $T_N$. In the former case, the vertical synhronizing signal is lacking so that it must be added. 'hree methods can be considered to compensate for lack f the vertical synchronizing signal. The first method omprises recording the vertical synchronizing signal 53 n one edge 7 of the magnetic tape 6, reproducing the ecorded synchronizing signal 53 from the magnetic tape , and obtaining a synchronizing signal responsive to the eproduced vertical synchronizing signal. The second nethod comprises drawing out an electrical signal deendent upon the rotation of the rotary disc 1 and recordng it on one edge 7 of the magnetic tape 6. During reroducing, this electrical signal is drawn out of the magietic tape 6 to obtain a synchronizing signal generated n response thereto. The third method comprises drawing ut, during reproducing, an electrical signal dependent ipon the rotation of the rotary disc 1 and obtaining a ulse signal 7C generated in response thereto. Thus it is ossible by these methods to obtain the television signal upplemented by the vertical synchronizing signal.

In the latter case, the reproduced television signal is rovided with a vertical synchronizing signal, and it is innecessary to especially generate a vertical synchronizng signal. In this case, a stable reproduced picture can e obtained by merely eliminating noises included in the ion-recorded period.

Figure 9:
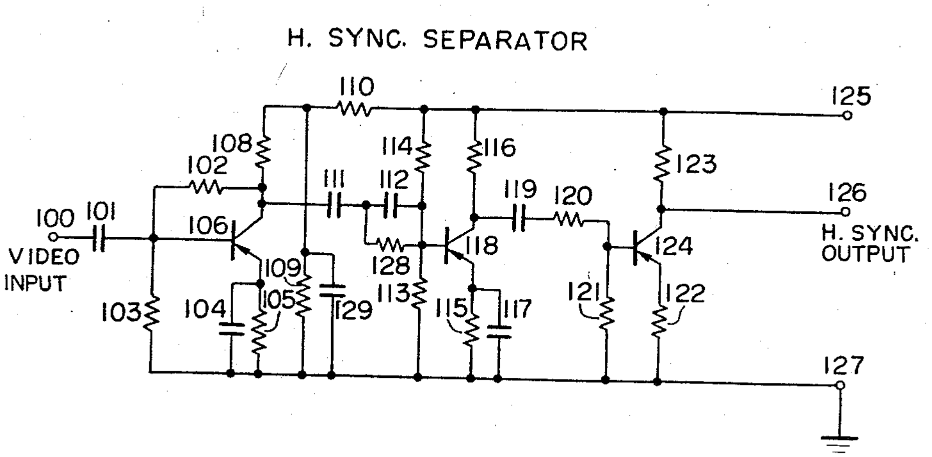
FIG. 9 is a circuit diagram of one example of a horizontal synchronizing signal separator in the device of the invention.

Hereinunder, detailed explanation will be given with egard to the case wherein the vertical synchronizing ignal 53 in included in the non-recorded period $T_N$, with eference to FIGS. 4, 7 and succeeding drawings. A porion of the reproduced television signal 7B is conducted o a horizontal synchronizing signal separator 19, detail of which is shown in FIG. 9, and the output pulse of the ircuit is sent to a clamper 21 so as to clamp the reproluced television signal 7B at a pedestal level or a peak evel of the synchronizing signal. On the other hand, a pulse signal 7C for generating a new vertical synchronizng signal is conducted through a terminal 25 into a pulse haper 24 comprising a phase shifter 26, a multivibrator 27 and an amplifier 28.

Figure 10:
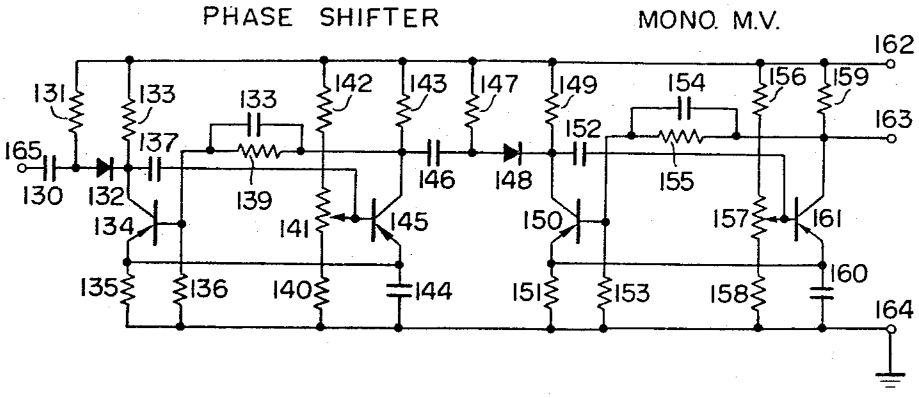
FIG. 10 is a circuit diagram of one example of a phase shifter and a pulse shaper in the device of the invention.

The pulse signal 7C is sent to the phase shifter 26, detail of which is shown in FIG. 10, and is subjected to phase shifting by a phase angle $\theta$, that is,, a time $t_2$–$t_1$ by the suitable manipulation of a rheostat 141 in the circuit of FIG. 10, so that the leading edge of the pulse is made to coincide with the starting portion $t_2$ of the non-recorded period. The leading edge of an output pulse signal 7D from the phase shifter 26 acts to trigger the monostable multivibrator 27 which thereby generates a pulse signal 7E. A rheostate 157 in FIG. 10 is suitably regulated so that the trailing edge of the pulse signal 7E is made to coincide with the terminating portion $t_3$ of the non-recorded period $T_N$. The pulse signal 7E is then passed through an amplifier 28 wherein the pulse signal 7E is reversed in polarity and sent to a mixer 22 in the form of a pulse signal with a wave form as shown at 7F. In the mixer 22, the pulse signal 7F is superposed on the reproduced television signal 7B clamped by the clamper 21, and any noise present in the non-recorded period $T_N$ is thereby forced downwardly by the pulse signal 7F. A composite signal 7G from the mixer 22 is transmitted into a clipper 23 wherein the signal 7G is clipped at the peak level of the synchronizing signal to take a wave form 7H. Thus, the noise in the non-recorded period $T_N$ can be eliminated. With regard to detail of a noise killer 20 comprising a series of above-described circuits, explanation will be given in a later description with reference to FIG. 12.

Explanation will now be made with regard to a vertical synchronizing signal generator 35. The generator 35 comprises a ringing amplifier 32, an amplifier 33 and a mixer 34 and will be explained with reference to FIG. 11. The pulse signal 7E is sent to the input of the ringing amplifier 32, wherein the signal 7E is amplified by a transistor 173 and then a damped oscillation as shown at a wave form 7I is caused by a resonance circuit comprising a capacitor 177 and an inductance 178, in which a half cycle of the oscillation corresponds to the period of width of the vertical synchronizing signal. A first half cycle on the negative side of this oscillation is clipped by a transistor 184 and then amplified to provide a pulse signal with a wave form 7J. The pulse signal 7J and the pulse signal 7E are mixed in the mixer 34 to provide a pulse signal having a wave form as shown at 7K. The pulse signal 7K and the composite signal 7H taken out of the mixer 20 are mixed in a mixer 29 to obtain a signal with a wave form as shown at 7L. This signal 7L forms an output video signal which is passed through an emitter follower 30 having a low impedance of 75 ohms and taken out of an output terminal 31. The mixer 29 and the emitter follower 30 will be explained in further detail in a later description with reference to FIG. 13.

Figure 14:
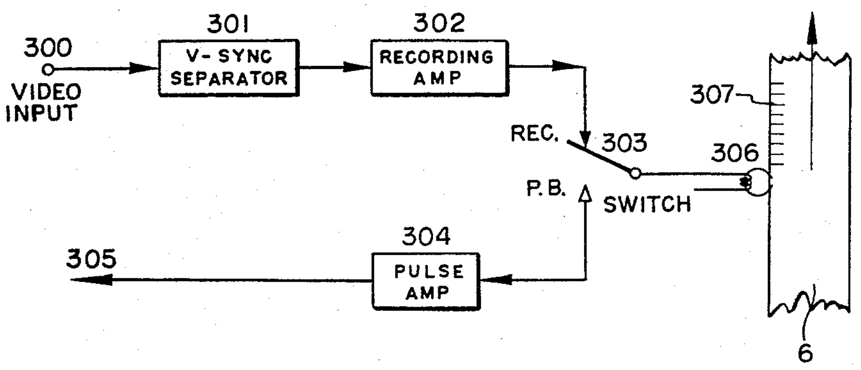
FIG. 14 is a block diagram of an electrical circuit for recording a vertical synchronizing signal on one edge of a magnetic tape and reproducing and taking out said recorded vertical synchronizing signal from the magnetic tape.

Detailed explanation will be given hereinunder with regard to the aforementioned three methods for obtaining a new vertical synchronizing signal in case of reproduction. At first, according to the first methods, the television signal 7A to be recorded is sent through a terminal 300 to a vertical synchronizing signal separator 301, as shown in FIG. 14, wherein the vertical synchronizing signal alone is separated and fed through an amplifier 302 and a switch 303 to a magnetic head 306 disposed along one edge 307 of the magnetic tape 6. The signal is thus recorded on the edge 307 of the magnetic tape 6. During reproducing, the reproduced signal derived by the magnetic head 306 is passed through an amplifier 304 and a terminal 305 and sent to the terminal 25 (FIG. 4) in the form of the wave form 7C.

Figure 15:
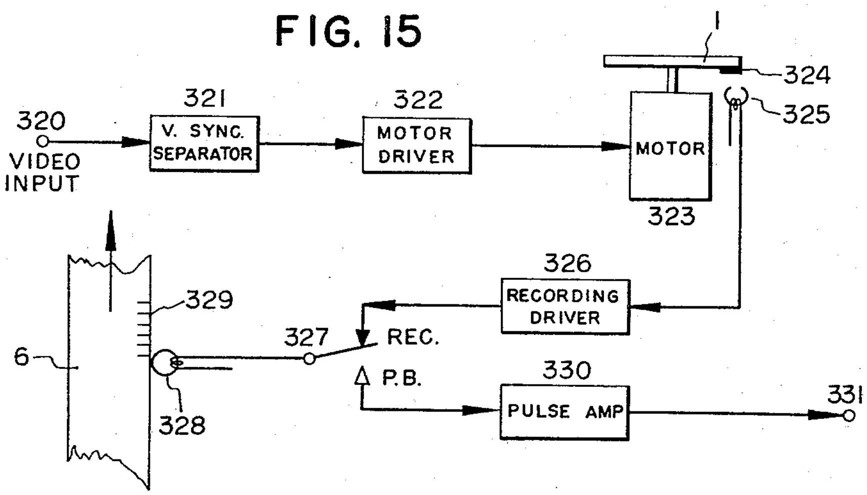
FIG. 15 is a block diagram of an electrical circuit for deriving an electrical signal dependent upon the rotation of the rotary head for recording said signal on one edge of a magnetic tape, and taking out during reproducing said recorded electrical signal from the magnetic tape.

According to the second method, the television signal 7A is sent through an input terminal 320 to a vertical synchronizing signal separator 321, as shown in FIG. 15, wherein the vertical synchronizing signal alone is separated and then conducted to an electric motor driver 322 to drive an electric motor 323 in synchronism with the cycle of the vertical synchronizing signal in the television signal. The motor 323 usually takes the form of a hysteresis synchronous motor. A permanent magnet 324 is mounted on the rotary disc 1 having the magnetic head 2 thereon, and the rotational movement of the permanent magnet 324 is detected by a rotation detecting magnetic head 325 disposed on the base plate. An electrical signal thereby obtained is fed through a recording drive 326 and a switch 327 to a magnetic head 328 disposed along one edge 329 of the magnetic tape 6. The signal is thus recorded on the edge 329 of the magnetic tape 6. During reproducing, the signal reproduced from the magnetic tape 6 by the magnetic head 328 is conducted through the switch 327 to a pulse amplifier 330, wherein the signal is amplified to a required level and then sent through a terminal 331 to the terminal 25 (FIG. 4) in the form of the wave form 7C.

Figure 16:
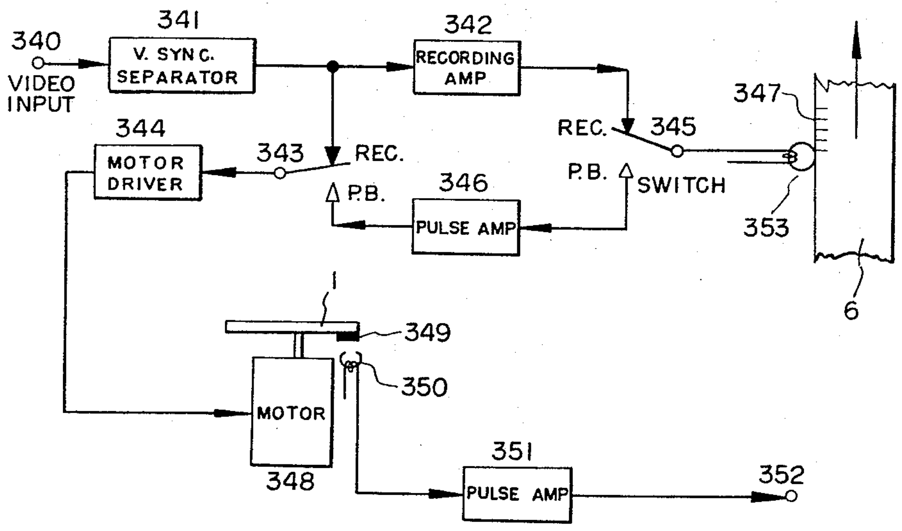
FIG. 16 is a block diagram of an electrical circuit for obtaining an electrical signal dependent upon the rotation of the rotary head during reproducing.

In the third method, a permanent magnet 349 is mounted on the rotary disc 1 having the magnetic head 2; as shown in FIG. 16, which disc is driven by an electric motor 348 which rotates during reproducing in synchronism with the recorded vertical synchronizing signal in the television signal. The rotational movement of the permanent magnet 349 is detected by a rotation detecting magnetic head 350 disposed on the base plate. An electrical signal thereby obtained is amplified by a pulse amplifier 351 to a required level and impressed through a terminal 352 on the terminal 25 (FIG. 4) in the form of the wave form 7C. In order to rotate the rotary head driving motor 348 in synchronism with the vertical synchronizing signal in the television signal to be recorded, a portion of the television signal to be recorded which is sent to a terminal 340 is passed through a vertical synchronizing signal separator 341 wherein the vertical synchronizing signal is solely separated and taken out. During recording, the motor 348 is driven by a motor driver 344 through a switch 343 so that the motor 348 is made to rotate in synchronism with the vertical synchronizing signal. The motor 348 generally takes the form of a hysteresis synchronous motor. A portion of said vertical synchronizing signal is supplied through a recording driver 342 and a switch 345 to a magnetic head 353 disposed along one edge 347 of the magnetic tape 6. Thus, the signal is recorded on the edge 347 of the magnetic tape 6. During reproducing, the vertical synchronizing signal recorded on the edge 347 of the magnetic tape 6 is reproduced by the magnetic head 353 and conducted through the switch 345 to a pulse amplifier 346 to be amplified to a required level. Thus, the motor 348 can be rotated by the motor driver 344 in synchronism with the recorded vertical synchronizing signal in the television signal.

Figure 5:
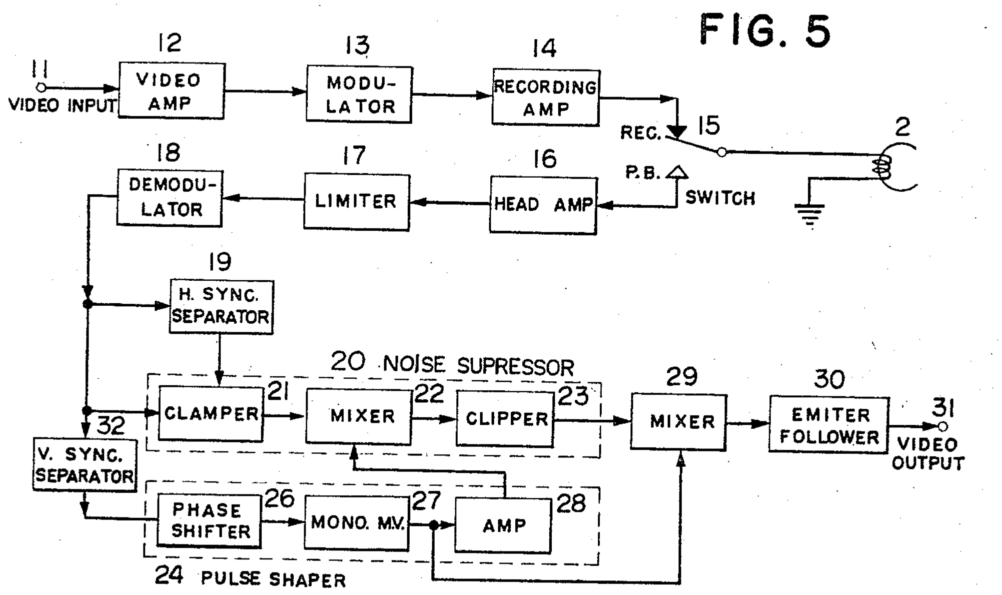
FIG. 5 is a block diagram similar to FIG. 4, but showing a case wherein the non-recorded period is disposed in the vertical blanking period of the television signal excluding a vertical synchronizing signal in the device according to the invention.
Figures 8A, 8M, 8N, 8O, 8P, 8Q, 8R, 8S, 8T, 8U:
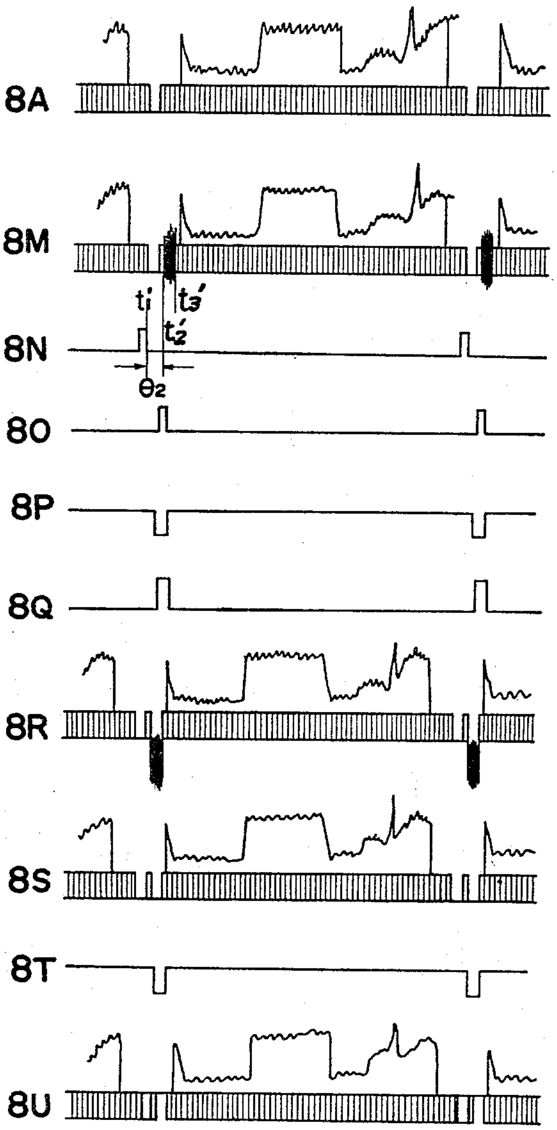
FIG. 8 is a view showing wave forms at various points of the circuit shown in FIG. 5.

With regard to the case wherein the vertical synchronizing signal 53 is not included in the non-recorded period $T_N$, detailed explanation will be given hereinunder with reference to FIGS. 5, 8 and succeeding drawings. A portion of a reproduced television signal 8M is conducted to the horizontal synchronizing signal separator 19, detail of which is shown in FIG. 9. The output pulse of this circuit is sent to the clamper 21, so that the reproduced television signal 8M is clamped at a pedestal level or at a peak level of the synchronizing signal. A portion of the reproduced television signal 8M is conducted to the vertical synchronizing signal separator 32 wherein the vertical synchronizing signal 8N alone is separated and taken out. The signal 8N is then conducted into the phase shifter 26, detail of which is shown in FIG. 10, and shifted in the phase by a phase angle $\theta_2$, that is, a time $t_2'-t_1'$ by suitably manipulating the rheostat 141 in this circuit so that the leading edge of a resultant pulse signal 8O is made to coincide with the starting portion $t_2'$ of the non-recorded period.

Figure 12:
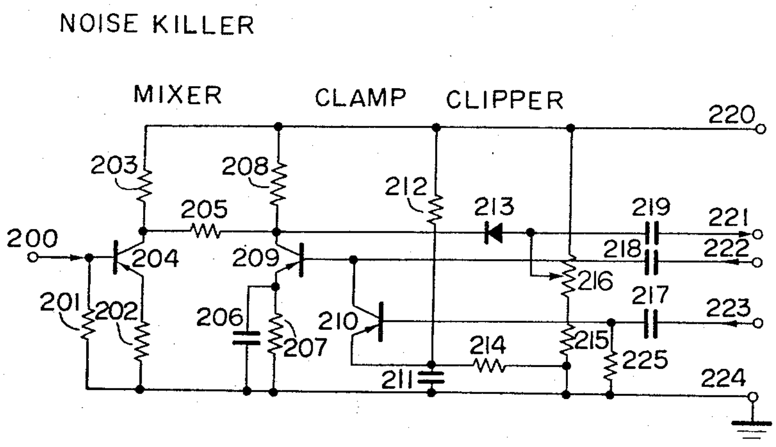
FIG. 12 is a circuit diagram of one example of a noise killer in the device of the invention.

The leading edge of said output pulse 8O acts to trigger the monostable multivbrator 27 to thereby generate a pulse signal 8P. The rheostat 157 is suitably regulated so that the trailing edge of this pulse 8P is made to coincide with a terminating portion $t_3'$ of the non-recorded period $T_N$. The pulse signal 8P is made to pass through the amplifier 28, wherein its polarity is reversed, as shown by a wave form 8Q which is then transmitted to the mixer 22. In the mixer 22, the pulse signal 8Q is superposed on the reproduced television signal 8M clamped by the clamper 21 so that any noise present in the non-recorded period $T_N$ is forced down by the pulse signal 8Q to provide a composite signal 8R. The composite signal 8R is fed to the clipper 23, wherein the signal is clipped at the peak level of the synchronizing signal and a wave form 8S is obtained. Thus, the noise in the non-recorded period $T_N$ can be eliminated. Detailed arrangement of the noise killer 20 comprising a series of said circuits is shown in FIG. 12, as described above. Further, an output wave form 8T of the monostable multivibrator 27 is superposed on the wave form 8S in the mixer 29 to provide a wave form 8U. An output video signal with the wave form 8U is made to pass through the emitter follower 30 having a low impedance of 75 ohms and taken out from the output terminal 21.

FIG. 9 shows a one example of said horizontal synchronizing signal separator 19. In the separator 19, transistors 106 and 117 act as a synchronizing signal separating circuit, while a transistor 124 acts as a buffer amplifier in an output stage. The television signal conducted to an input terminal 100 is impressed on the base of the transistor 106 through a capacitor 101. The transistor 106 is a synchronizing signal separator of the type having a feedback resistance 102 between the collector and the base thereof. The signal at the collector of the transistor 106 is sent through a capacitor 111, a high frequency characteristic compensating capacitor 112 and a resistance 128 to the base of the transistor 118. The transistor 118 is a synchronizing signal separator of the type commonly used, in which the horizontal synchronizing signal component alone is separated and taken out from the collector thereof. The separated signal is supplied to the base of the transistor 124 through a capacitor 119 and a resistance 120. The transistor 124 is a buffer amplifier having a load resistance 123 of an extremely low value in its collector circuit and a negative feed-back resistance 122 of a high value in its emitter circuit, and the horizontal synchronizing signal at a low impedance is derived from its collector and conducted to an output terminal 126. There is provided a D.C. source of 12 volts, which is connected at the positive potential side to an earth terminal 127 and at the negative potential side to a terminal 125. Various components in the separator 19 have the following values:

| | |
|---|---|
| Transistors: | |
| 101 | 2SA70 |
| 118 | 2SA70 |
| 124 | 2SA70 |
| Resistors: | |
| 102 | 100KΩ |
| 103 | 12KΩ |
| 105 | 1.2KΩ |
| 108 | 10KΩ |
| 109 | 8.2KΩ |
| 110 | 1KΩ |
| 113 | 33KΩ |
| 114 | 47KΩ |
| 115 | 820Ω |
| 116 | 3.9KΩ |
| 120 | 5.6KΩ |
| 121 | 10KΩ |
| 122 | 3.3KΩ |
| 123 | 12Ω |
| 128 | 1.2KΩ |
| Capacitors: | |
| 101 | mf 1 |
| 104 | mf 5 |
| 111 | mf 1 |
| 112 | mf 0.005 |
| 117 | mf 10 |
| 119 | mf 10 |
| 129 | mf 30 |

FIG. 10 shows a one example of the pulse shaper 24 described above and will be explained in conjunction with FIG. 7. In the pulse shaper 24, transistors 134 and 145 act as the phase shifter 26, while transistors 150 and 161 act as the monostable multivibrator 27. The pulse signal 7C fed to an input terminal 165 is used as triggering pulse of the collector of the transistor 134 through a capacitor 130 and a diode 132, and on the base of the transistor 145 through a capacitor 137. The transistors 134 and 145 are a monostable multivibrator and an output pulse signal is aken out from the collector of the transistor 145. The vidth of the output pulse is suitably adjusted by the rheo- ;tat 141 interposed in the base circuit of the transistor 145. [he output pulse is differentiated by a differentiator com- ɔrising a capacitor 146 and a resistance 147. Further, the ɔositive component of the differentiated pulse 7D ob- :ained by differentiating the trailing edge of the output ɔulse of the collector of the transistor 145 is taken out by ı diode 148 and sent to the monostable multivibrator 27. Thus, it will be known that the differentiated pulse 7D ıcting as a triggering pulse for the succeeding stage is lelayed by a phase angle $\theta_1$ compared with the input pulse 7C. The phase angle $\theta_1$ is adjustable by the rheostat 141 ıs described above so that the leading edge of said dif- ferentiated pulse 7D can be made to coincide with the starting portion $t_2$ of the non-recorded period $T_N$ of the :elevision signal 7B.

Said second pulse 7D is triggered on the collector of :he transistor 150 and further on the base of the transistor 161 through a capacitor 152. The output pulse signal 7E of the monostable multivibrator 27 is taken out from the collector of the transistor 161 and sent to an output terminal 163. The width of the second output pulse 7E can be adjusted by the rheostat 157 interposed in the base circuit of the transistor 161 so that it can be made to coincide with the non-recorded period $T_N$ of the television signal 7B. There is provided a D.C. source of 12 volts which is connected at the positive potential side to an earth terminal 164 and at the negative potential side to a terminal 162. Various components in the pulse shaper 24 have the following values:

| | |
|---|---|
| Transistors: | |
| 134 | 2SB176 |
| 145 | 2SB176 |
| 150 | 2SB176 |
| 161 | 2SB176 |
| Diodes: | |
| 131 | OA95 |
| 148 | OA95 |
| Resistors: | |
| 131 | 47KΩ |
| 133 | 4.7KΩ |
| 135 | 1KΩ |
| 136 | 10KΩ |
| 139 | 15KΩ |
| 140 | 27KΩ |
| 141 | 50KΩ |
| 142 | 18KΩ |
| 143 | 4.7KΩ |
| 147 | 47KΩ |
| 149 | 4.7KΩ |
| 151 | 1KΩ |
| 153 | 10KΩ |
| 155 | 15KΩ |
| 156 | 18KΩ |
| 157 | 20KΩ |
| 158 | 27KΩ |
| 159 | 4.7KΩ |
| Capacitors: | |
| 130 | mf__ 0.03 |
| 137 | mf__ 0.1 |
| 138 | mf__ 0.002 |
| 144 | mf__ 10 |
| 146 | mf__ 0.01 |
| 152 | mf__ 0.05 |
| 154 | mf__ 0.002 |
| 160 | mf__ 10 |

Figure 11:
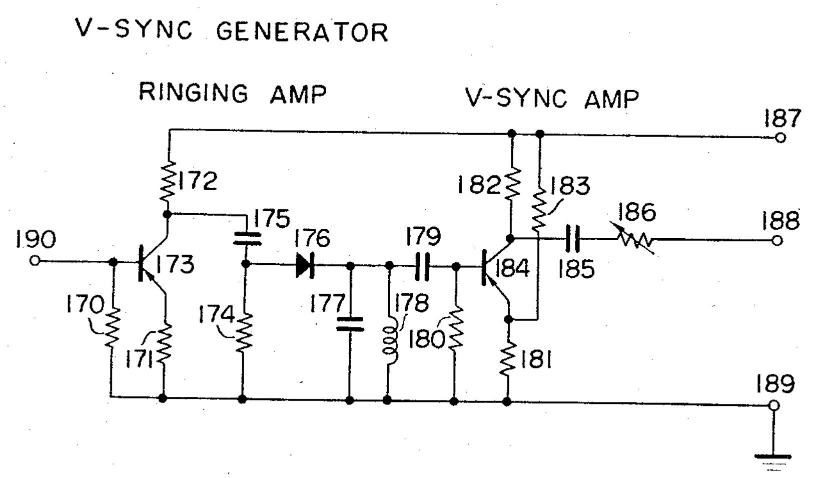
FIG. 11 is a circuit diagram of one example of a vertical synchronizing signal generator and a shaper in the device of the invention.

FIG. 11 shows one example of the vertical synchronizing signal generator 35 described previously and will be explained in conjunction with FIG. 7. In the signal generator 35, a transistor 173 acts as the ringing amplifier 32, while a transistor 184 acts as the vertical synchronizing signal amplifier 33. The pulse signal 7E fed to an input terminal 190 is sent to the base of the transistor 173. The signal amplified and inverted in its polarity by the transistor 173 is taken out of the collector of this transistor and conducted through a capacitor 175 and a diode 176 into a resonance circuit comprising an inductance 178 and a capacitor 177 for generating a damped oscillation. A half cycle of the oscillation is made to approximately equal the period of the vertical synchronizing signal. The oscillating pulse signal 7I is then fed through a capacitor 179 to the base of the transistor 184, where the tip portion of the first negative half cycle of the oscillating wave form 7I is clipped and separated by a biasing action by resistances 181 and 183 interposed in the emitter circuit of said transistor. The selected component alone is amplified by the same transistor 184 and taken out of the collector thereof in the form of the wave form 7J, which is then conducted to an output terminal 188 through a capacitor 185 and a level regulating rheostat 186. This wave form 7J is utilized as a new vertical synchronizing signal. As in the case of previous circuits, there is provided a D.C. source which is connected between an earth terminal 189 and a terminal 187. Various components in the generator 35 have the following values:

| | |
|---|---|
| Transistors: | |
| 173 | 2SA70 |
| 184 | 2SA70 |
| Diode: | |
| 176 | OA95 |
| Resistors: | |
| 170 | 10KΩ |
| 171 | 3.3KΩ |
| 172 | 4.7KΩ |
| 174 | 56KΩ |
| 180 | 33KΩ |
| 181 | 2.7KΩ |
| 182 | 3.3KΩ |
| 183 | 10KΩ |
| 186 | 50KΩ |
| Capacitors: | |
| 175 | mf__ 0.1 |
| 177 | mf__ 0.005 |
| 179 | mf__ 5 |
| 185 | mf__ 10 |
| Inductance: | |
| 178 | mh__ 20 |

FIG. 12 shows one example of the noise killer 20 described in foregoing, and will be explained in conjunction with FIG. 7. In the noise killer 20, a transistor 210 acts as the clamper 21, transistors 204 and 209 act as the mixer 22, and a diode 213 acts as the clipper 23. The horizontal synchronizing signal obtained by the horizontal synchronizing signal separator 19 is fed from a terminal 223 and impressed on the base of the transistor 210 through a capacitor 217. Since the emitter of the transistor 210 is maintained at a fixed potential by resistors 212 and 214, the transistor 210 conducts only during the period of the synchronizing signal impressed on the base of this transistor. Therefore, the collector is at the potential approximately equal to that of the emitter. The collector is connected to the base of the transistor 209 so as to maintain a constant pedestal level of the television signal 7B impressed on the base of the transistor 209 through an input terminal 222 and a capacitor 218. The television signal 7B amplified by the transistor 209 is fed through a resistor 205 and superposed on the pulse signal 7F, which is admitted to the base of the transistor 204 through a terminal 200 and amplified by said transistor 204, to provide the wave form 7G. Said pulse signal 7F has been obtained by amplifying the pulse signal 7E by the amplifier 28 and by inverting its polarity, which pulse signal 7E was obtained by the monostable multivibrator 27 in said pulse shaper 24. The pulse signal 7E has a pulse width equal to the width of the non-recorded period $T_N$ of the reproduced television signal 7B. The superposed signal 7G obtained in the collector circuit of the transistor 209 is clipped at the peak level of the synchronizing signal thereof by the diode 213, the clipping level of which is set by resistors 215 and 216. Therefore, the noise component is eliminated from the television signal 7G in which the noise existing in the non-recorded period $T_N$ is urged towards the negative potential side by said pulse wave form 7F. Thus, the television signal 7G now takes the wave form 7H and is sent to an output terminal 221 through a capacitor 219. There is provided a D.C. source of 12 volts, which is interposed between an earth terminal 224 and a terminal 220. Various components in the noise killer 20 have the following values:

| | | | |
|---|---|---|---|
| Transistors: | | | |
| **204** | | | 2SB176 |
| **209** | | | 2SA70 |
| **210** | | | 2SB176 |
| Diode: | | | |
| **213** | | | OA95 |
| Resistors: | | | |
| **201** | | | 12KΩ |
| **202** | | | 1KΩ |
| **203** | | | 5.6KΩ |
| **205** | | | 1KΩ |
| **207** | | | 1KΩ |
| **208** | | | 3.3KΩ |
| **212** | | | 22KΩ |
| **214** | | | 5.6KΩ |
| **215** | | | 10KΩ |
| **216** | | | 100KΩ |
| **225** | | | 1MΩ |
| Capacitors: | | | |
| **206** | | mf | 0.000039 |
| **211** | | mf | 10 |
| **217** | | mf | 0.1 |
| **218** | | mf | 0.03 |
| **219** | | mf | 30 |

Figure 13:
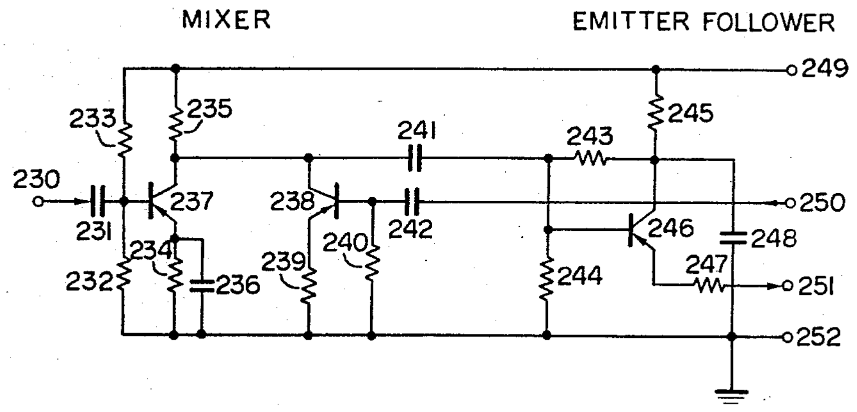
FIG. 13 is a circuit diagram of one example of a mixer in the device of the invention.

FIG. 13 shows one example of the output circuit comprising said mixer 29 and said emitter follower 30 and will be explained in conjunction with FIG. 7. In this circuit, transistors 237 and 238 act as the mixer 29, while a transistor 246 acts as the emitter follower 30. The signal 7H from the output terminal 221 of the clipper 23 in said noise killer 20 is sent to an input terminal 230 of this circuit and impressed on the base of the transistor 237 through a capacitor 231. The output wave form 7J of the vertical synchronizing signal amplifier 33 in the vertical synchronizing signal generator 35 is mixed in the mixer 34 with the output pulse 7E of the monostable multivibrator 27 in the pulse shaper 24 and subjected to the polarity reversion to take the wave form 7K, which is then sent to a terminal 250 of this circuit and impressed on the base of the transistor 238 through a capacitor 242. These two signals impressed on the respective bases of the transistors 237 and 238 are amplified and subjected to the polarity reversion, then mixed in the collector circuit comprising the respective collectors of the transistors to provide the signal with wave form 7L. The wave form 7L is impressed on the base of the transistor 246 through a capacitor 241. The transistor 246 is of the type acting as an emitter follower in which the emitter circuit comprises a terminal resistance of 75 ohms interposed between an output terminal 251 and an earth terminal 252, and has an extremely low output impedance. The wave form 7L is conducted by the emitter follower 30 to the output circuit having a low impedance and utilized as a reproduced television signal. Further, there is also provided a D.C. source of 12 volts, which is interposed between the earth terminal 252 and a terminal 249. Various components in the circuit have the following values:

| | | | |
|---|---|---|---|
| Transistors: | | | |
| **237** | | | 2SA70 |
| **238** | | | 2SA70 |
| **246** | | | 2SA279 |
| Resistors: | | | |
| **232** | | | 10KΩ |
| **233** | | | 39KΩ |
| **234** | | | 1KΩ |
| **235** | | | 2.7KΩ |
| **239** | | | 1KΩ |
| **240** | | | 10KΩ |
| **244** | | | 5.6KΩ |
| **245** | | | 330Ω |
| **247** | | | 33Ω |
| Capacitors: | | | |
| **231** | | mf | 30 |
| **236** | | mf | 0.000039 |
| **241** | | mf | 5 |
| **242** | | mf | 30 |
| **248** | | mf | 10 |

Although, in the foregoing description, the invention has been explained with reference to the preferred embodiment, it will be understood for those skilled in the art that the invention is in no way limited to such specific embodiment and various modifications and changes may be made without departing from the spirit of the invention.

What is claimed is:

1. A device for recording and reproducing a television signal comprising a magnetic tape, a rotary head including a magnetic transducer, said magnetic transducer being adapted to successively sweep diagonally across said magnetic tape, means for holding said magnetic transducer in disengagement from said magnetic tape for a constant range from the end of one sweep by said magnetic transducer on said magnetic tape to the beginning of the succeeding sweep, said range being effective to produce a non-recorded period, means for rotating said rotary head in synchronism with a cycle of a vertical synchronizing signal in said television signal, said non-recorded period being disposed in a vertical blanking period of said television signal, means for recording a video signal including a horizontal synchronizing signal in said television signal on said magnetic tape by said rotary head, means for recording said vertical synchronizing signal on one edge of said magnetic tape, means for reproducing said recorded vertical synchronizing signal from said magnetic tape so as to obtain a synchronizing signal responsive to said reproduced vertical synchronizing signal, and means for reproducing said recorded video signal from said magnetic tape for combining said reproduced video signal with said synchronizing signal.

2. A device for recording and reproducing a television signal comprising a magnetic tape, a rotary head including a magnetic transducer, said magnetic transducer being adapted to successively sweep diagonally across said magnetic tape, means for holding said magnetic transducer in disengagement from said magnetic tape for a constant range from the end of one sweep by said magnetic transducer on said magnetic tape to the beginning of the succeeding sweep, said range being effective to produce a non-recorded period, means for recording a video signal including a horizontal synchronizing signal in said television signal on said magnetic tape by said rotary head, means for deriving an electrical signal dependent upon the rotation of said rotary head, means for recording said electrical signal on one edge of said magnetic tape, means for reproducing said recorded electrical signal from said magnetic tape for obtaining a synchronizing signal responsive to said reproduced electrical signal, and means for reproducing ıid recorded vedio signal from said magnetic tape for ɔmbining said reproduced video signal with said synɪronizing signal.

3. A device for recording and reproducing a television gnal comprising a magnetic tape, a rotary head inluding a magnetic transducer, said magnetic transucer being adapted to successively sweep diagoally across said magnetic tape, means for holding aid magnetic transducer in disengagement from said ıagnetic tape for a constant range from the end of one weep by said magnetic transducer on said magnetic tape ɔ the beginning of the succeeding sweep, said range eing effective to produce a non-recorded period, means ɔr synchronizing a cycle of a vertical synchronizing ignal in said television signal with the rotation of said otary head, said non-recorded period being disposed /ithin a vertical blanking period of said television signal, ıeans for recording a video signal including a horizonal synchronizing signal in said television signal on said ıagnetic tape by said rotary head, means for deriving n electrical signal dependent upon the rotation of said otary head, means for recording said electrical signal ın one edge of said magnetic tape, means for reproducıg said recorded signal from said magnetic tape for lriving said rotary head in synchronism with said reproluced signal, means for obtaining a synchronizing signal esponsive to said electrical signal derived dependent ıpon the rotation of said rotary head from said electrical ignal, and means for reproducing said recorded video ignal from said magnetic tape for combining said reproluced video signal with said synchronizing signal.

4. A device for recording and reproducing a wideɔand signal comprising a magnetic tape, a rotary head ncluding a magnetic transducer, said magnetic transducer being adapted to successively sweep diagonally ıcross said magnetic tape, means for holding said magıetic transducer in disengagement from said magnetic ape for a constant range from the end of one sweep ɔy said magnetic transducer on said magnetic tape to he beginning of the succeeding sweep, said range being ːffective to produce a non-recorded period, means for ynchronizing a cycle of a vertical synchronizing signal n said television signal with the rotation of said rotary ıead, said non-recorded period being disposed within a ɔack porch of a vertical blanking period, means for ecording a video signal including a synchronizing signal n said television signal on said magnetic tape by said otary head, and means for reproducing said recorded /ideo signal from said magnetic tape for eliminating a ıoise existing in said non-recorded period.

5. A device for recording and reproducing a television ;ignal comprising a magnetic tape, a rotary head includng a magnetic transducer, said magnetic transducer being ıdapted to successively sweep diagonally across said tape, ı tape guide member having said rotary head disposed herein, a first idler roller having an axis parallel with he axis of said tape guide member for guiding said nagnetic tape towards a starting portion of the sweep ɔy said magnetic transducer on said magnetic tape, a ;econd idler roller having an axis parallel with the axis ɔf said tape guide member for guiding said magnetic ːape away from a terminating portion of the sweep by ;aid magnetic transducer on said magnetic tape, said two dler rollers and said tape guide member being firmly ìxed on a common base plate so as to maintain said nagnetic transducer in disengagement from said magıetic tape for a constant range, said range being effective ːo produce a non-recorded period, means for rotating ;aid rotary head in synchronism with a cycle of a vertical ;ynchronizing signal in said television signal, said nonːecorded period being disposed within a vertical blanking ɔeriod of said television signal, means for recording a /ideo signal including a horizontal synchronizing signal in said television signal on said magnetic tape by said rotary head, means for recording said vertical synchronizing signal on one edge of said magnetic tape, a pulse generator for reproducing said recorded vertical synchronizing signal from said magnetic tape for generating a synchronizing signal responsive to said reproduced vertical synchronizing signal, a noise killer for reproducing said recorded video signal from said magnetic tape for eliminating any noise existing in said non-recorded period included in said reproduced video signal, and a mixer for combining said reproduced video signal freed from the noise in said non-recorded period with said synchronizing signal.

6. A device for recording and reproducing a television signal comprising a magnetic tape, a rotary head including a magnetic transducer, said magnetic transducer being magnetic tape, a tape guide member having said rotary head disposed therein, a first idler roller having an axis parallel with the axis of said tape guide member for guiding said magnetic tape towards a starting portion of the sweep by said magnetic transducer on said magnetic tape, a second idler roller having an axis parallel with the axis of said tape guide member for guiding said magnetic tape away from a terminating portion of the sweep by said magnetic transducer on said magnetic tape, said two idler rollers and said tape guide member being firmly fixed on a common base plate so as to maintain said magnetic transducer in disengagement from said magnetic tape for a constant range, said range being effective to produce a non-recorded period, means for rotating said rotary head in synchronism with a cycle of a vertical synchronizing signal in said television signal, said non-recorded period being disposed within a vertical blanking period of said television signal, means for recording a video signal including a horizontal synchronizing signal in said television signal on said magnetic tape by said rotary head, means for deriving an electrical signal dependent upon the rotation of said rotary head, means for recording said electrical signal on one edge of said magnetic tape, a synchronizing pulse generator for reproducing said recorded electrical signal from said magnetic tape for generating a synchronizing signal responsive to said reproduced electrical signal, a noise killer for reproducing said recorded video signal from said magnetic tape for eliminating any noise existing in said non-recorded period included in said reproduced video signal, and a mixer for combining said reproduced video signal freed from the noise in said non-recorded period with said synchronizing signal.

7. A device for recording and reproducing a television signal comprising a magnetic tape, a rotary head including a magnetic transducer, said magnetic transducer being adapted to successively sweep diagonally across said magnetic tape, a tape guide member having said rotary head disposed therein, a first idler roller having an axis parallel with the axis of said tape guide member for guiding said magnetic tape towards a starting portion of the sweep by said magnetic transducer on said magnetic tape, a second idler roller having an axis parallel with the axis of said tape guide member for guiding said magnetic tape away from a terminating portion of the sweep by said magnetic transducer on said magnetic tape, said two idler rollers and said tape guide member being firmly fixed on a common base plate so as to maintain said magnetic transducer in disengagement from said magnetic tape for a constant range, said range being effective to produce a non-recorded period, means for rotating said rotary head in synchronism with a cycle of a vertical synchronizing signal in said television signal, said non-recorded period being disposed in a vertical blanking period of said television signal, means for recording a video signal including a horizontal synchronizing signal in said television signal on said magnetic tape by said rotary head, a pulse generator for generating a pulse signal dependent upon the rotation of said rotary head, means for recording said electrical signal on one edge of said magnetic tape, means for reproducing said recorded pulse signal from said magnetic tape for synchronously driving said rotary head in synchronism with said reproduced signal, means for obtaining a synchronizing signal responsive to said electrical signal derived dependent upon the rotation of said rotary head from said electrical signal, a noise killer for reproducing said recorded video signal from said magnetic tape for eliminating any noise existing in said non-recorded period included in said video signal, and a mixer for combining said reproduced video signal freed from the noise in said non-recorded perio with said synchronizing signal.

References Cited

UNITED STATES PATENTS 3,251,934 5/1966 Van Den Bussche --- 178—6.

JOHN W. CALDWELL, *Acting Primary Examiner.*

DAVID G. REDINBAUGH, *Examiner.*

H. W. BRITTON, *Assistant Examiner.*